(12) United States Patent
Gellert

(10) Patent No.: US 12,524,028 B2
(45) Date of Patent: Jan. 13, 2026

(54) WATER SUPPLY SYSTEM

(71) Applicant: AQUA MANAGER APS, Copenhagen K (DK)

(72) Inventor: Jimmi Gellert, Frederiksberg (DK)

(73) Assignee: AQUA MANAGER APS, Copenhagen K (DK)

( * ) Notice: Subject to any disclaimer, the term of this patent is extended or adjusted under 35 U.S.C. 154(b) by 193 days.

(21) Appl. No.: 17/795,314

(22) PCT Filed: Jan. 28, 2021

(86) PCT No.: PCT/EP2021/052022
§ 371 (c)(1),
(2) Date: Jul. 26, 2022

(87) PCT Pub. No.: WO2021/152036
PCT Pub. Date: Aug. 5, 2021

(65) Prior Publication Data
US 2023/0078137 A1    Mar. 16, 2023

(30) Foreign Application Priority Data

Jan. 31, 2020 (EP) .................................... 20154796
Oct. 9, 2020 (EP) .................................... 20201133

(51) Int. Cl.
*G05D 23/13* (2006.01)
*E03B 7/04* (2006.01)
(Continued)

(52) U.S. Cl.
CPC ............ *G05D 23/1393* (2013.01); *E03B 7/04* (2013.01); *E03B 7/071* (2013.01); *E03B 7/075* (2013.01); *E03B 7/078* (2013.01); *E03C 1/055* (2013.01)

(58) Field of Classification Search
CPC ....... G05D 23/1393; E03B 7/04; E03B 7/071; E03B 7/075; E03B 7/078; E03C 1/055
See application file for complete search history.

(56) References Cited

U.S. PATENT DOCUMENTS 2,991,481 A    7/1961 Book
4,886,207 A *  12/1989 Lee ........................ E03C 1/057
                                                       251/30.01

(Continued)

FOREIGN PATENT DOCUMENTS

CN    1821637 A     8/2006
CN    102979135 A   3/2013
(Continued)

OTHER PUBLICATIONS

Eng. machine translation of KR 2103153 B1 (Year: 2020).*
(Continued)

*Primary Examiner* — Abby J Flynn
*Assistant Examiner* — Matthew John Moscola
(74) *Attorney, Agent, or Firm* — Workman Nydegger

(57) ABSTRACT

The present disclosure provides a water supply system. The system comprises a central water supply, a plurality of water taps, at least one operation device located at one water tap, a piping system connecting the central water supply and the plurality of water taps, the piping system comprising a separate flow path from the central water supply to each water tap, and a controller for individually controlling a flow of water from the central water supply to the plurality of water taps and individually controlling an outlet temperature of the flow of water at an outlet of the central water supply. The controller is located at the central water supply, and the controller is operable via the operation device at the water tap.

16 Claims, 17 Drawing Sheets

(51) Int. Cl.
*E03B 7/07* (2006.01)
*E03C 1/05* (2006.01)

(56) References Cited

U.S. PATENT DOCUMENTS

| | | | |
|---|---|---|---|
| 6,250,558 B1 * | 6/2001 | Dogre Cuevas ... | G05D 23/1393 236/94 |
| 10,626,583 B2 | 4/2020 | Mazz et al. | |
| 10,745,893 B2 * | 8/2020 | Silverstein ............. | E03B 7/075 |
| 11,047,761 B1 * | 6/2021 | Frackelton ......... | G01M 3/2815 |
| 2011/0088799 A1 | 4/2011 | Jung | |
| 2013/0112762 A1 * | 5/2013 | Pan ...................... | F16K 11/052 236/12.11 |
| 2015/0136377 A1 * | 5/2015 | Kallesoe ................ | F24D 5/04 236/13 |
| 2015/0218784 A1 | 8/2015 | Mazz et al. | |
| 2015/0322652 A1 * | 11/2015 | Mazz ................. | G05D 7/0623 137/583 |
| 2017/0247863 A1 * | 8/2017 | Kobayashi ............. | E03B 7/071 |
| 2017/0308796 A1 * | 10/2017 | Heng ................... | G06N 20/00 |
| 2018/0148912 A1 * | 5/2018 | Park ....................... | E03C 1/055 |
| 2019/0056255 A1 * | 2/2019 | Aarts ...................... | F17D 3/01 |
| 2019/0219276 A1 | 7/2019 | Acker | |
| 2019/0381464 A1 * | 12/2019 | Salas Arranz ..... | G05D 23/1931 |
| 2020/0224394 A1 * | 7/2020 | Mariano ................ | E03B 7/075 |

FOREIGN PATENT DOCUMENTS

| | | | |
|---|---|---|---|
| CN | 104820380 A | 8/2015 | |
| CN | 208075095 U | 11/2018 | |
| DE | 8128904 U1 | 10/1982 | |
| DE | 10109884 A1 | 9/2001 | |
| EP | 0195271 A2 | 9/1986 | |
| EP | 2557365 B1 | 5/2015 | |
| JP | H01203842 A | 8/1989 | |
| JP | 4445884 B2 | 4/2010 | |
| KR | 2103153 B1 * | 4/2020 | ............... E03B 7/02 |
| WO | 03023155 A1 | 3/2003 | |

OTHER PUBLICATIONS

Chinese Search Report from Corresponding Chinese Patent Application No. CN202180011732.9, Jul. 13, 2023.
Search Report from corresponding European Application No. 20154796, Jul. 7, 2020.
International Search Report from PCT Application No. PCT/EP2021/052022, Apr. 19, 2021.
International Preliminary Report on Patentability from PCT Application No. PCT/EP2021/052022, Apr. 13, 2022.
Chinese Office Action from Corresponding Chinese Patent Application No. CN202180011732.9, May 25, 2024.
European Search Report from Corresponding European Patent Application No. EP25171685, Aug. 14, 2025.

* cited by examiner

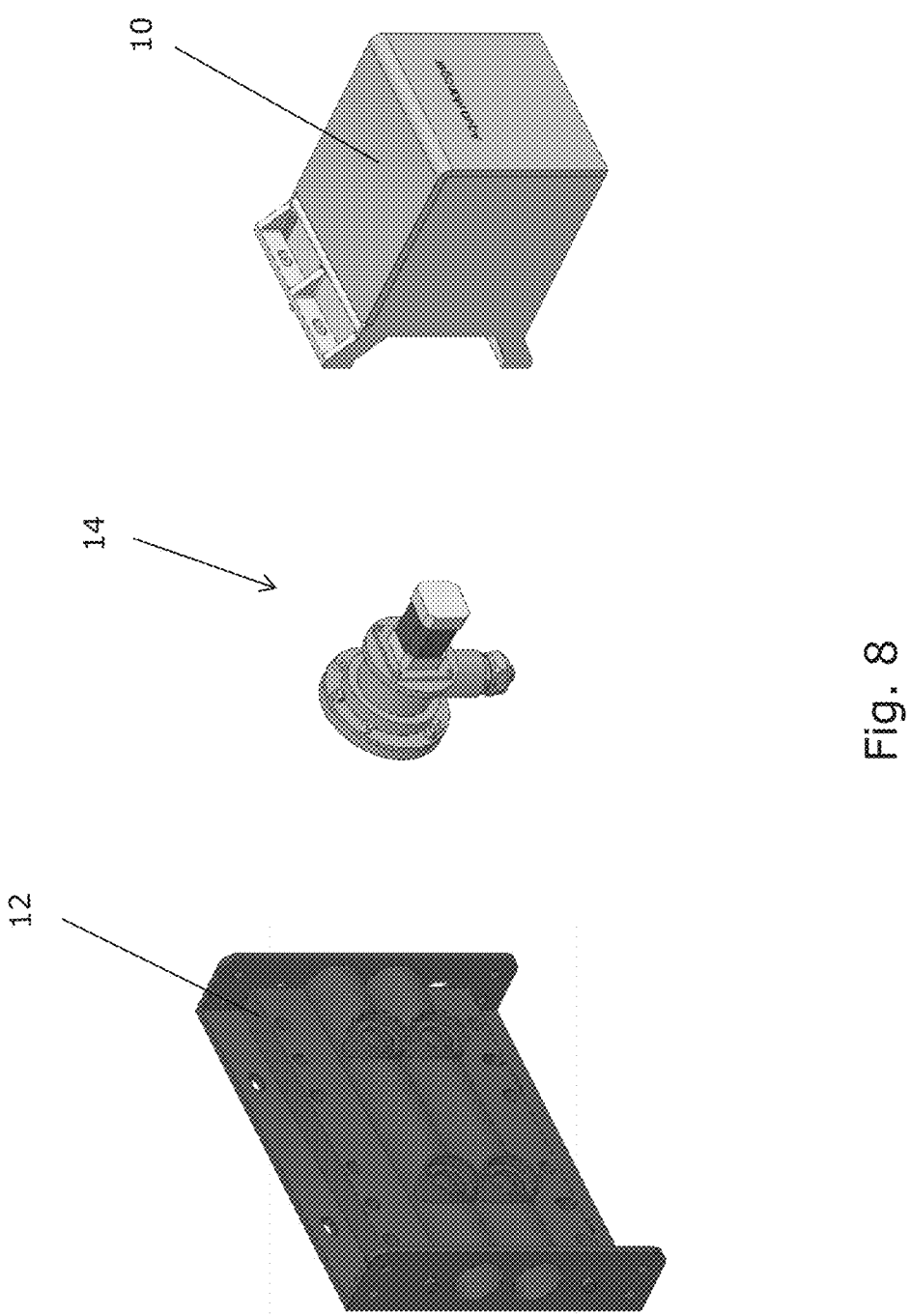

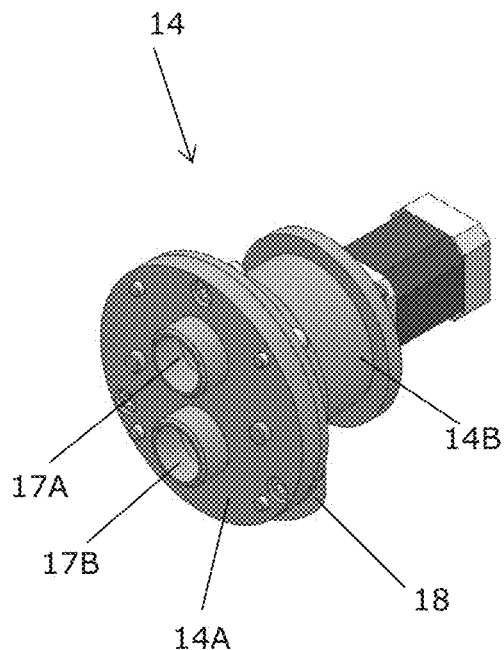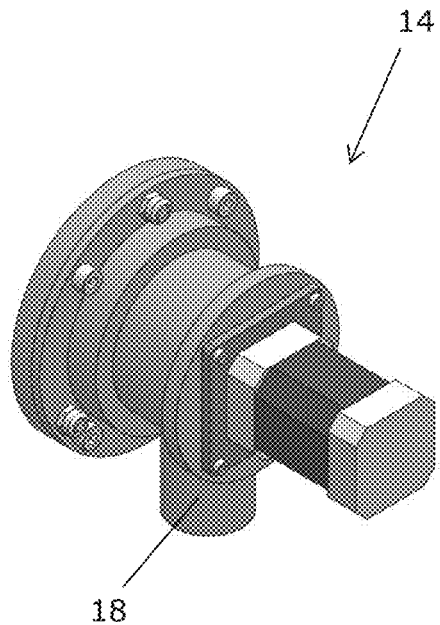
Fig. 10A        Fig. 10B
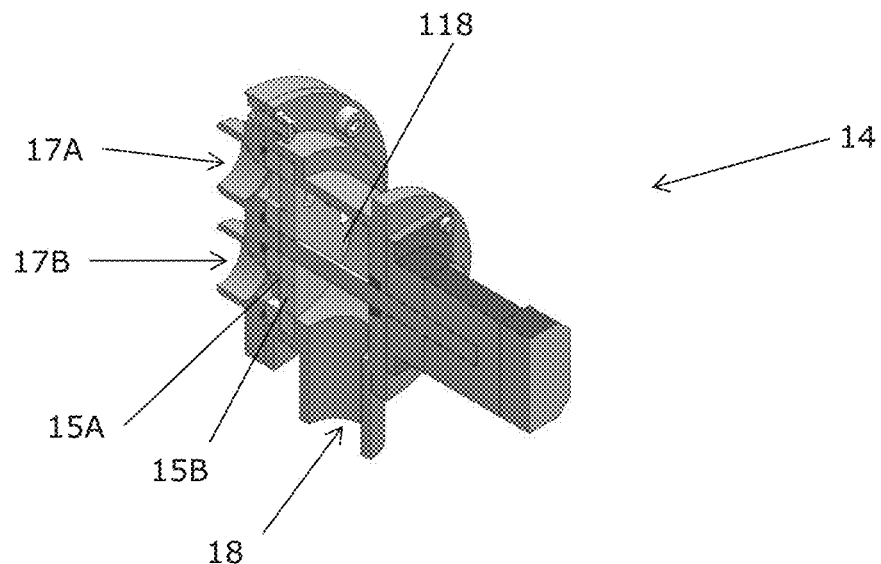
Fig. 10C

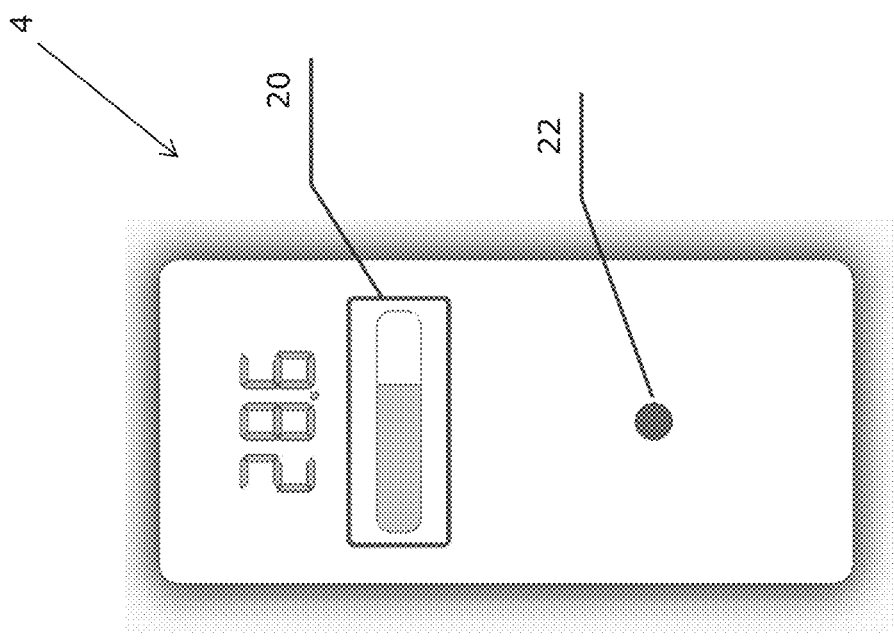
Fig. 16
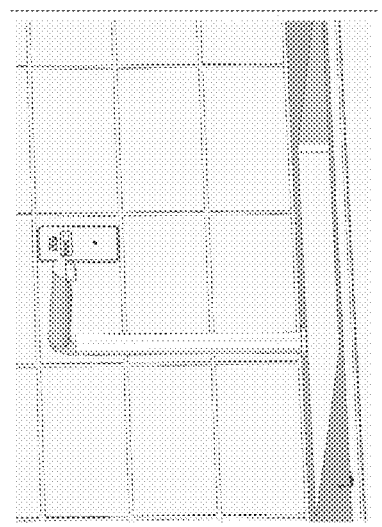

WATER SUPPLY SYSTEM

INTRODUCTION

The present disclosure relates to a water supply system and to a method of controlling the water supply system, more particularly to control the flow of water and control the temperature in the system.

BACKGROUND

Traditionally, water supply systems comprise a hot water supply pipe, a cold water supply pipe, and a circulation pipe to ensure that the user should not wait too long before water at an acceptable temperature is obtained at the individual taps.

SUMMARY

It is an object of embodiments of the disclosure to provide an improved water supply system.

It is a further object of embodiments of the disclosure to provide an improved method of controlling a water supply system.

According to a first aspect, the disclosure provides a water supply system comprising:
- a central water supply,
- a plurality of water taps;
- at least one operation device located at one water tap,
- a piping system connecting the central water supply and the plurality of water taps, the piping system comprising a separate flow path from the central water supply to each water tap; and
- a controller for individually controlling a flow of water from the central water supply to the plurality of water taps and individually controlling an outlet temperature of the flow of water at an outlet of the central water supply;
- wherein the controller is located at the central water supply, and wherein the controller is operable via the at least one operation device at the water tap.

By providing a controller at the central water supply and being operable via an operation device at the water tap, a non-pressurised supply system is provided. An advantage of such a non-pressurised water supply system is that in case of a leak in the piping system, only the amount of water contained in the pipe from the central water supply to the water tap will flow out in the building.

The water supply system may be a domestic water supply system for supply of domestic water in domestic buildings, such as single family houses and apartments, a water supply system for supply of water in offices, in industry, in agriculture, in health care, such as hospitals, or other places where water is used. The water supply system may additionally supply water for heating in domestic buildings, in offices, in industry, in agriculture, in health care, such as hospitals, or other places where heating is needed.

The central water supply may be a water tank for storage of water within the building in which the supply system is arranged. Alternatively, the central water supply may be a manifold, an inlet of water to the building, a common water storage for supply of a plurality of buildings, etc. By the term 'central water supply' is meant that the water tank/manifold/inlet may be capable of supplying water to a number of water taps in a building or a to a number of water taps in a plurality of buildings.

The system comprises a plurality of water taps. At a water tap, a user may tap water for drinking, bathing, cooking, cleaning, etc. In the context of the present invention, the term 'water tap', covers traditional water taps in a kitchen, in a bathroom, in another room having one or more taps, an outdoor tap, but also a shower, a water tap at bathtub, at a Jacuzzi, or at a hot tub, etc. Furthermore, the term 'water tap' also covers toilets, bidets, washing machines, dishwashers, and similar. Thus, a 'water tap' may be any element in a building or outside a building at which water may be tapped for drinking, bathing, cooking, cleaning, washing, flushing, etc.

In an alternative embodiment, the water supply system may be used for supply of water for heating, where the water tap may instead cover a radiator, a floor heater, of similar heater. Thus, in the following, the term 'water tap' also covers a 'heater'.

An operation device is located at least at one water tap to allow a user to tap water. By 'operation' is e.g. meant start and stop of the flow of water from the central water supply. The controller being located at the central water supply and the operation device being located at the water tap are two separate devices. The water supply system may comprise a plurality of operation devices. These operation devices may each operate the controller to control the flow of water to each water tap. In one embodiment, an operation device is located at each water tap. However, in an alternative embodiment, two or more water taps may share an operation device. As an example, a shower and a washbasin located in the same room may each comprise a water tap which may both be operated by a single operation device.

The operation device may be configured to generate an electric demand signal, and the controller may be configured to receive the electric demand signal and configured to control the flow of water and the outlet temperature in response to the demand signal. The electric demand signal may be communicated from the operation device to the controller via wireless communication. In an alternative embodiment, the communication may be wired communication.

A piping system connects the central water supply and the plurality of water taps. The piping system forms a flow path for water from the central water supply to the plurality of water taps, where the piping system comprises a separate flow path from the central water supply to each water tap. The piping system may be formed of a single pipe extending from the central water supply to the water tap. In one embodiment, the piping system may comprise a plurality of pipes.

The piping system may be formed of polypropylene, different types of polyethylene, metal, or another suitable material.

Typically, the pipes have a cross-section being circular. It should however be understood, that another cross-section, such as an oval cross-section, a square-shaped, a triangular-shaped cross-section, or any other cross-section it also applicable.

The diameter of the pipes of the piping system having a circular cross-section may be in the range of 5-100 mm, or even more. It should be understood, that the diameter of a pipe to one water tap may be different from the diameter of a pipe to another water tap. Furthermore, it should be understood that the diameter for the piping system may vary. In a domestic building, the inner diameter of a pipe for supply of water to a water tap, e.g. in a kitchen or a bathroom will typically be about 8 mm, with an outer diameter of about 12 mm. It should be understood that pipes having another diameter may also be applicable. The size of the pipes may as an example depend on the distance to the water tap, the expected amount of water to be used, required maximum flow demands, etc.

The water supply system further comprises a controller for controlling a flow of water from the central water supply to the plurality of water taps. In a simple embodiment, the controller is adjustable between a fully open configuration and a closed configuration to thereby provide either a maximum flow (100% flow) or zero flow. In an alternative embodiment, the controller is adjustable between a plurality of configurations allowing for a plurality of different flow rates between the maximum flow (100% flow) and zero flow.

The controller is located at the central water supply, whereby the flow is regulated at the central water supply. The controller is operable via the operation device at the water tap, whereby a user can operate the controller from the location of the water tap. The communication between the controller and the operation device may be wireless, e.g. by use of WIFI. The operation device may as an example be attached to the wall, to a washbasin, to a cupboard, or another element in the area of the water tap. In one embodiment, the operation device may be of a size and shape which allows the operation device to be built into a fixation for a traditional wall socket. The operation device may consequently be at a fixed position. In an alternative embodiment, the operation deceive may be a portable device.

In one embodiment, the operation device may be a mobile phone, or another similar portable device. In a specific embodiment, a mobile phone may constitute the operation device and operation of the controller may be carried out by use of an App at the mobile phone. In an alternative embodiment, the operation device may be operated via a mobile phone or similar device.

To facilitate regulation of the flow of water from the central water supply, the controller may comprise at least one flow regulator, such as a valve, for controlling of the flow of water. Thus, the controller may comprise at least one of a valve, a motor, a PCB, and other elements for controlling the flow and for communication with the operation device.

The controller may comprise a separate flow regulator for each water tap to thereby control the flow of water individually for each water tap.

The controller is additionally configured to control an outlet temperature of the flow of water at an outlet of the central water supply. In one embodiment, the outlet temperature of the flow of water may be controlled by mixing hot and cold water at the central water supply, such as in a water mixing chamber arranged in communication with the central water supply.

When controlling the outlet temperature of the flow of water, the distance to the associated water tap may be taken into account to thereby provide a flow of water with a desired outlet temperature at the water tap. Thus, if the specific water tap is located far away from the central water supply, the outlet temperature of the water leaving the central water supply may be warmer than water for a water tap being located closer to the central water supply if the desired temperature at the water tap is the same.

To facilitate control of the water temperature, the controller may comprise or may be in communication with a control unit which may comprise an algorithm being configured to calculate the required outlet temperature of water leaving the central water supply in dependency of the desired water temperature at the water tap and the distance between the water tap and the central water supply.

Thus, the controller is configured for individual control of the flow of water from the central water supply to each water tap, and is additionally configured for individual control of an outlet temperature of the flow of water from the central water supply to each water tap. In one embodiment, the flow regulator may be configured for controlling both the flow of water and the outlet temperature of the flow of water. This may be done individually for each water tap. In an alternative embodiment, a flow regulator and a temperature regulator as two separate devices may be applied.

The water supply system may comprise a measurement device configured to measure the outlet temperature of the water at the outlet from the central water supply system. The measurements may be used to fine-tune the temperature of the flow of water at the outlet as the measurements may be used as input in an adjustment algorithm for the controller to thereby facilitate delivery of water at the desired temperature at the water tap.

The central water supply may further comprise a circulation pipe for circulation of water through the central water supply. This may facilitate ensure that the temperature of the water at the central water supply is kept above 55 degrees C. to lower the risk of *Legionella* and may further facilitate control of the temperature of the water and thus a shorter response time with regard to the delivery of water at the desired temperature at the water tap.

To facilitate individual control of water flow and water temperature at each water tap, the piping system comprises a separate flow path from the central water supply to each water tap.

An operation device may be located at each water tap, which operation device is configured for communication with the controller to control the flow of water to the water tap and to control the temperature of the water. By arranging an operation device at each water tap, a user may control the flow of water and the temperature of the water to a specific water tap at the water tap in question. It should be understood, that an operation device may alternatively be used to control the flow of water and the temperature of the water at more than one tap. These alternatives may be combined, whereby the system may comprise one or more operation device each being located at one water tap to operate the controller to control flow and temperature to a single water tap and where the system additionally may comprise one or more operation device each being located at a water tap to operate the controller to control flow and temperature to one or more water taps.

The operation device may be configured to receive an operation signal in the form of at least one of a touch signal, an audible signal, and a gesture signal, and configured to operate the controller based on the received signal. The operation device may as an example comprise a touch panel to control flow and/or temperature by tapping on the panel and/or by applying a pressure to the panel. In one embodiment, the touch panel may comprise a plurality of areas, each area specifying a water flow of a specific amount and/or a specific temperature to thereby correspond to a plurality of different user patterns. In an alternative embodiment, applying a pressure at a certain area will increase the temperature, whereas a pressure applied at another area will decrease the temperature. Likewise may a pressure at a certain area increase the flow, whereas a pressure applied at another area may decrease the flow of water.

It should be understood, that the above described possibilities of application of user pattern from a plurality of specific area at the device may be combined with the described application of pressure at certain areas.

In another embodiment, operation may be carried out by use of an audible signal. As an example by the use of commands in the form of 'warmer', 'colder', 'more', 'less', 'stop', and 'start'. Other commands may also be applicable. Predefined commands corresponding to a user pattern may also be incorporated, such as 'tooth brushing', 'hand washing', or 'shower', where each command correspond to a flow of water at a specified temperature, having a specified flow, and having a specified duration. It may in one embodiment be possible to discontinue a predefined command after initiating the command, e.g. if the associated action is regretted.

In a further embodiment, operation may be carried out by a gesture signal. The same type of events as describe above may be achieved by a gesture. As an example, the water flow may be warmer, if a user's hand is moved to the right.

It should be understood that the above commands are examples of commands, and that other commands and/or additional commands may also be applied.

By the application of an audible signal and/or a gesture signal, it may be possible to operate the operation device without touching the operation device which may decrease the risk of transfer of bacteria due to poor hygiene.

In one embodiment, at least two of the different types of signals may be combined.

The controller may be in communication with a database comprising a plurality of predetermined control strategies, each defining a requested water flow and a requested temperature. The predetermined control strategies may thus correspond to a number of user patterns, such a 'tooth brushing', 'hand washing', and 'shower'. Some predetermined control strategies may be stored in the database when installing the system, whereas other control strategies may be added by a user via a user interface. In one embodiment, it may be possible to not only add control strategies, it may also be possible to amend predetermined control strategies by the user interface. Via the database, the controller may control at least one of the flow of water and the temperature. The operation device may be configured for selection of at least one predetermined control strategy.

For additional security, the piping system may comprise an inner tube and an outer tube being co-axially arranged, where the outer tube is configured for protection of the inner tube. If the inner tube forming the flow path for the water should be damaged, leaking water can be kept in the outer tube without damaging the building. For further security, leakage surveillance may be applied by the use of a piping system comprising an inner tube and an outer tube as a surveillance element may be arranged in the cavity between the inner and outer tube. The surveillance element may be configured to provide an alarm if water is detected in the cavity. In one embodiment, the surveillance element may generate an alarm signal which may be sent to at least one of the controller, the operation device, a mobile phone, a surveillance device, or another device which may be read by a user or which may be capable of providing an alarm to a user.

The water supply system may further comprise a monitoring unit for monitoring use of water. The controller may be configured to forward to the monitoring unit a use signal specifying the flow of water from the central water supply, and the monitoring unit may be configured to store said use signal.

In one embodiment, the monitoring unit may be configured to store use signals for each water tap separately. It may as an example be possible to compare the use signals with previously stored use signals; i.e. historic values, and/or it may be possible to compare the use signals with expected values. By these comparisons it may be possible to detect faults, such as a leaking toilet with continuous water use.

The controller may be configured to forward to the monitoring unit a temperature signal specifying the temperature of the flow of water from the central water supply. The monitoring unit may likewise be configured to store said temperature signal, whereby interrelated values of flow and temperature may be monitored and may be stored in the monitoring unit.

A user may be able to log into the monitoring unit to get access to the monitored and stored use signals and/or temperature signals. The monitoring unit may alternatively or additionally be in communication with a mobile phone, another portable device, a pc, or another user accessible device.

When monitoring flow and temperature, the system may identify that one or more parts of the piping system, for a period primarily has been exposed to water of a temperature in the range of 20-45 degrees C. As *Legionella* may be at risk, if the temperature is not regularly above 55 degrees, this risk may be eliminated by aid of the monitoring of flow and temperature. If such a situation is found during the monitoring, the system may create a warning signal/message. In response hereto, a user may request heating of the water to a temperature above 55 degrees, and provide a flow of water through the part of the piping in question to thereby kill any *Legionella* bacteria if any (*Legionella* flushing). The system may comprise a security measure, which ensures that the heating of water is not carried out when a user operates the controller at a water tap located at the concerned piping system.

Monitoring of flow may also provide the possibility of separate accounting of water consumption at the individual water taps. Additional monitoring of temperature may provide a more precise accounting. This possibility may be especially relevant for apartment buildings and office buildings with a plurality of tenancies.

In one embodiment, the central water supply may be in fluid communication with an additional supply device comprising an additional medium, where supply of the additional medium to at least one water tap may be controlled by the controller. The additional medium may be a fluid, such as a gas or a liquid medium. As an example, the additional medium may be $CO_2$ to be able to provide sparkling/carbonated water. Another example of an additional medium may be a detergent, which may be particularly relevant when the water tap is a washing machine or a dishwasher. In one embodiment, the additional medium may be water heated e.g. by a cooker to provide water of a temperature being higher than traditional hot water provided by a tap water. In embodiments, where the water supply systems is used in industry, the additional medium may as an example be oil or a colourant, e.g. for food or fabric. Other media may also be applicable dependent on the type of water tap.

The controller may in one embodiment be configured for simultaneous control of supply of the flow of water and supply of the additional medium to at least one water tap. Thus, the controller may control the supply of water and the additional medium so that water and the additional medium are supply simultaneously. Alternatively, the simultaneous control may be achieved by alternating supply of water and the additional medium.

The additional medium may be supplied to the water tap via the separate flow path from the central water supply to the water tap. The additional medium may be mixed with warm and cold water in a water mixing chamber arranged in communication with the central water supply. In an alternative embodiment, the additional medium may be mixed with warm and cold water in an additional mixing chamber arranged after a water mixing chamber, whereby the additional medium may be added after providing a requested water flow and water temperature. In a further alternative, the additional medium may be added to the flow path via an inlet in the piping system without the use of an additional mixing chamber.

According to a second aspect, the disclosure provides a method of controlling a water supply system comprising a central water supply; a plurality of water taps; an operation device located at one water tap; a piping system connecting the central water supply and the plurality of water taps, the piping system comprising a separate flow path from the central water supply to each water tap; and a controller for individually controlling a flow of water from the central water supply to the at least one tap and individually controlling an outlet temperature of the flow of water at an outlet of the central water supply, the controller is located at the central water supply; the method comprising a step of operating the controller via the operation device at the water tap.

It should be understood, that a skilled person would readily recognise that any feature described in combination with the first aspect of the disclosure could also be combined with the second aspect of the disclosure, and vice versa.

The water supply system according to the first aspect of the disclosure is very suitable for performing the method steps according to the second aspect of the disclosure. The remarks set forth above in relation to the water supply system are therefore equally applicable in relation to the method.

According to a third aspect, the disclosure provides a controller for controlling a flow of water in a water supply system, the controller comprising an operation device for receiving a user demand, a flow regulator and a temperature regulator for controlling a flow in the water supply system and for controlling an outlet temperature of the flow of water at an outlet of the central water supply, and a communication device for communication with the operation device, wherein the controller is configured to control the flow of water and an outlet temperature of the flow of water at an outlet of the central water supply based on a received demand from the operation device.

The flow regulator and the operation device may be two separate devices, and the flow regulator may be configured to be positioned at a central water supply. The operation device may be arranged at a water tap, where a user may provide user demand to thereby control the flow of water and in one embodiment also control the temperature of the water.

The flow regulator and the temperature regulator may be a single regulation unit, as exemplified below.

It should be understood, that a skilled person would readily recognise that any feature described in combination with the first aspect and the second aspect of the disclosure could also be combined with the third aspect of the disclosure, and vice versa.

The controller according to the third aspect of the disclosure is very suitable for the water supply system of the first aspect, and very suitable for performing the method steps according to the second aspect of the disclosure. The remarks set forth above in relation to the water supply system and the method are therefore equally applicable in relation to the controller.

In a specific embodiment, the flow regulator may comprise two separate regulation elements which are movable relative to each other. The inlet to the flow regulator may comprise a hot water inlet and a cold water inlet. When moving at least one of the regulation elements, an opening ratio may be adjusted to thereby adjust the flow of water and the temperature of the water leaving the flow regulator. The hot water inlet and the cold water inlet may be located at one side of the regulation elements, whereas the outlet of the flow regulator may be located at the opposite side of the regulation elements.

The flow regulator may comprise a drive element, e.g. a motor, which may be configured for moving at least one of the regulations elements relative to the other one of the regulation elements. In embodiment, the drive element may be a step motor.

In one embodiment, one of the regulation elements is fixedly mounted in the flow regulator, whereas the other regulation element is movably mounted. The fixedly mounted may be denoted a stationary regulation element, whereas the movably mounted may be denoted a movable regulation element.

Each of the regulation elements may comprises one or more openings. By moving the regulation element relative to each other, an overlap between the opening(s) in the stationary regulation element and the opening(s) in the movable regulation element may be varied to thereby vary flow and/or temperature.

In one embodiment, the stationary regulation element may comprise two openings, one being in fluid communication with the hot water inlet and the other one being in fluid communication with the cold water inlet to the flow regulator. The openings may be of the same size and/or shape.

The movable regulation element may comprise two openings, four openings, six openings, eight openings, ten openings, or even more openings, such as 20 openings or 30 openings. At least some of the openings may be of different size. In one embodiment, the openings are identical in pairs. The flow through the flow regulator may be dependent on the overlap between the openings in the stationary regulation element and the openings in the movable regulation element. The overlap may also determine the temperature of the flow of water.

Flow and water temperature may be varied by providing regulation elements of different sizes and/or shapes, with a different number of openings, with a different sizes and/or shapes of the openings.

BRIEF DESCRIPTION OF THE DRAWINGS

Embodiments of the disclosure will now be further described with reference to the drawings, in which:

FIG. 8 illustrates separate parts of an embodiment of a controller for a water supply system, FIGS. 10A-10C illustrate an embodiment of a flow regulator, FIG. 16 illustrates an embodiment of an operation device.

DETAILED DESCRIPTION OF THE DRAWINGS

It should be understood that the detailed description and specific examples, while indicating embodiments of the disclosure, are given by way of illustration only, since various changes and modifications within the spirit and scope of the disclosure will become apparent to those skilled in the art from this detailed description.

Figure 1:
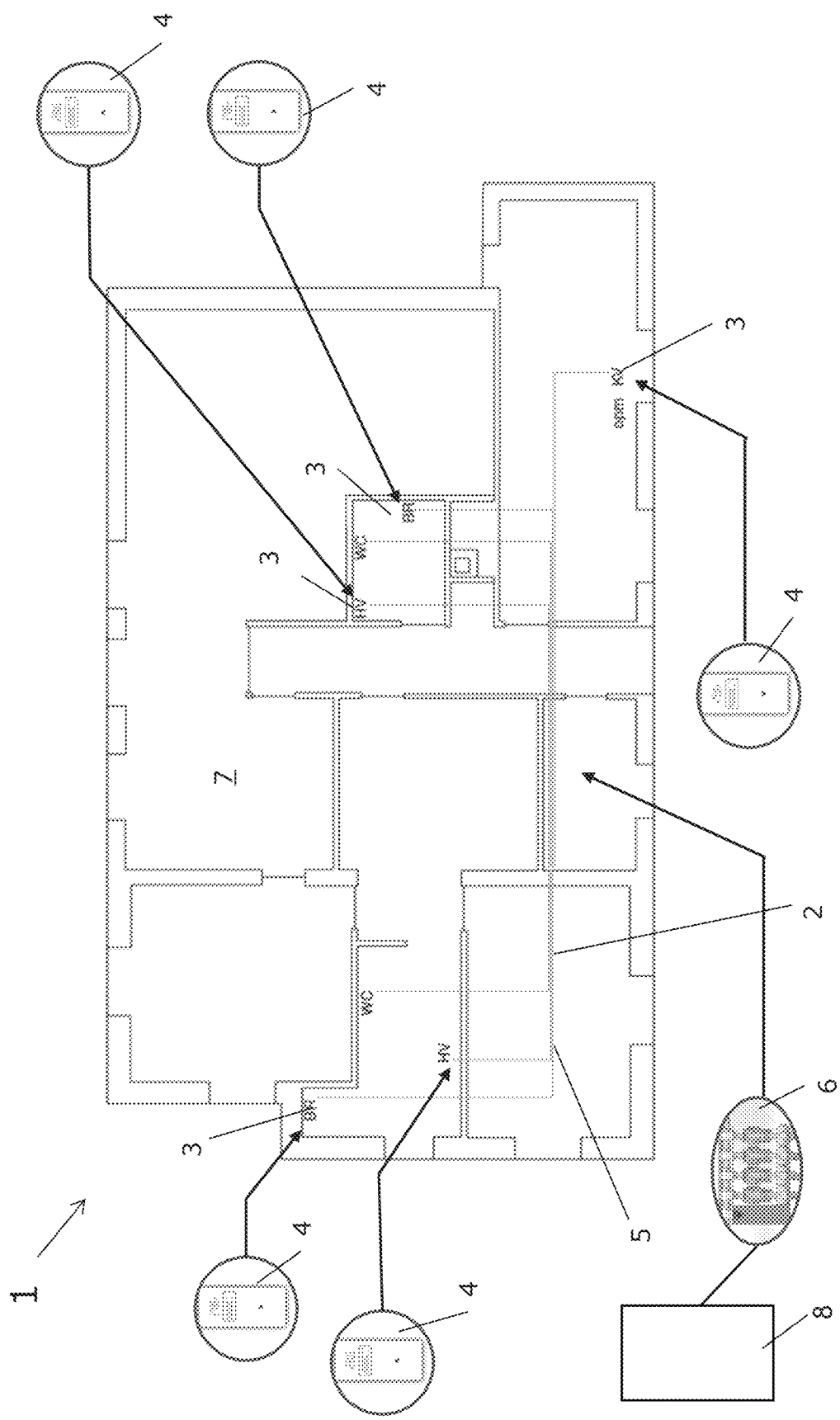
FIG. 1 illustrates an embodiment of a water supply system.

FIG. 1 illustrates an embodiment of a water supply system 1. The water supply system 1 comprises a central water supply 2 and at least one water tap 3. In the illustrated embodiment, the system comprises five different water taps 3, where BR is a bath, HV is a washbasin, and KV is a kitchen washbasin. An operation device 4 is located at each of the water taps 3.

A piping system 5 connects the central water supply 2 and each of the water taps 3. The piping system 5 forms a flow path for water from the central water supply 2 to each of the water taps 3. The piping system 5 is formed by separate pipes extending from the central water supply 2 to each of the water taps 3 to from a separate flow path to each water tap 3.

The water supply system 1 further comprises a controller 6 for controlling a flow of water from the central water supply 2 to the water taps 3 and for controlling the temperature of the water. The controller 6 is located at the central water supply 1, and is operable via the operation device 4 at the water tap 3. The water supply system 1 may further comprise a monitoring unit 8 for monitoring use of water. The controller 6 may be configured to forward to the monitoring unit 8 a use signal specifying the flow of water from the central water supply 2, and the monitoring unit 8 may be configured to store said use signal.

In the illustrated embodiment, the water supply system 1 is arranged in a single-family house 7 which is seen from above.

Figure 2:
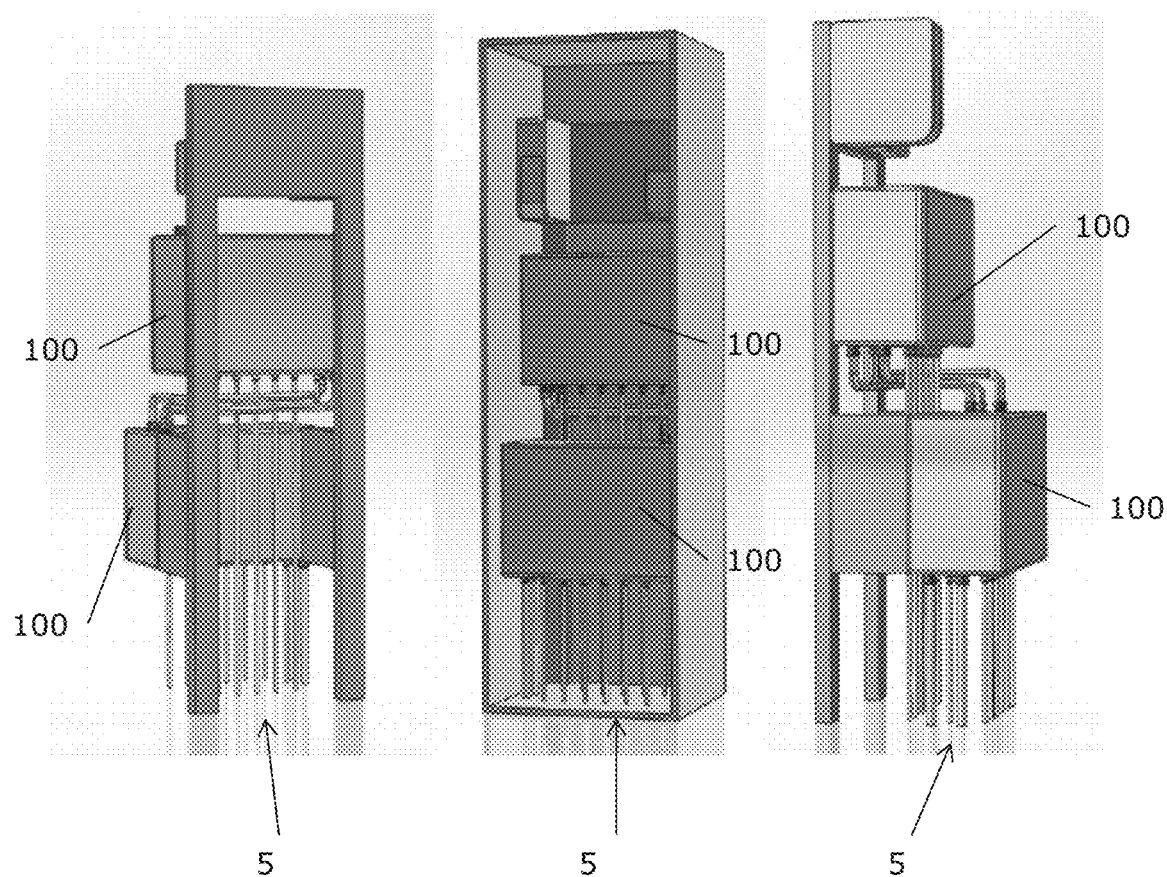
FIG. 2 illustrates parts of an embodiment of a water supply system.

FIG. 2 illustrates parts of an embodiment of a water supply system 1. Each of the boxes 100 comprises six separate controller elements 6' (see FIGS. 3, 4, and 5). Each controller element 6' forms part of the controller 6 for controlling a flow of water and for controlling the temperature of the water. The piping system 5 forming a separate flow path for water from the central water supply 2 to each of the water taps 3 is illustrated by a part of the separate pipes extending from each of the boxes 100.

Figure 3:
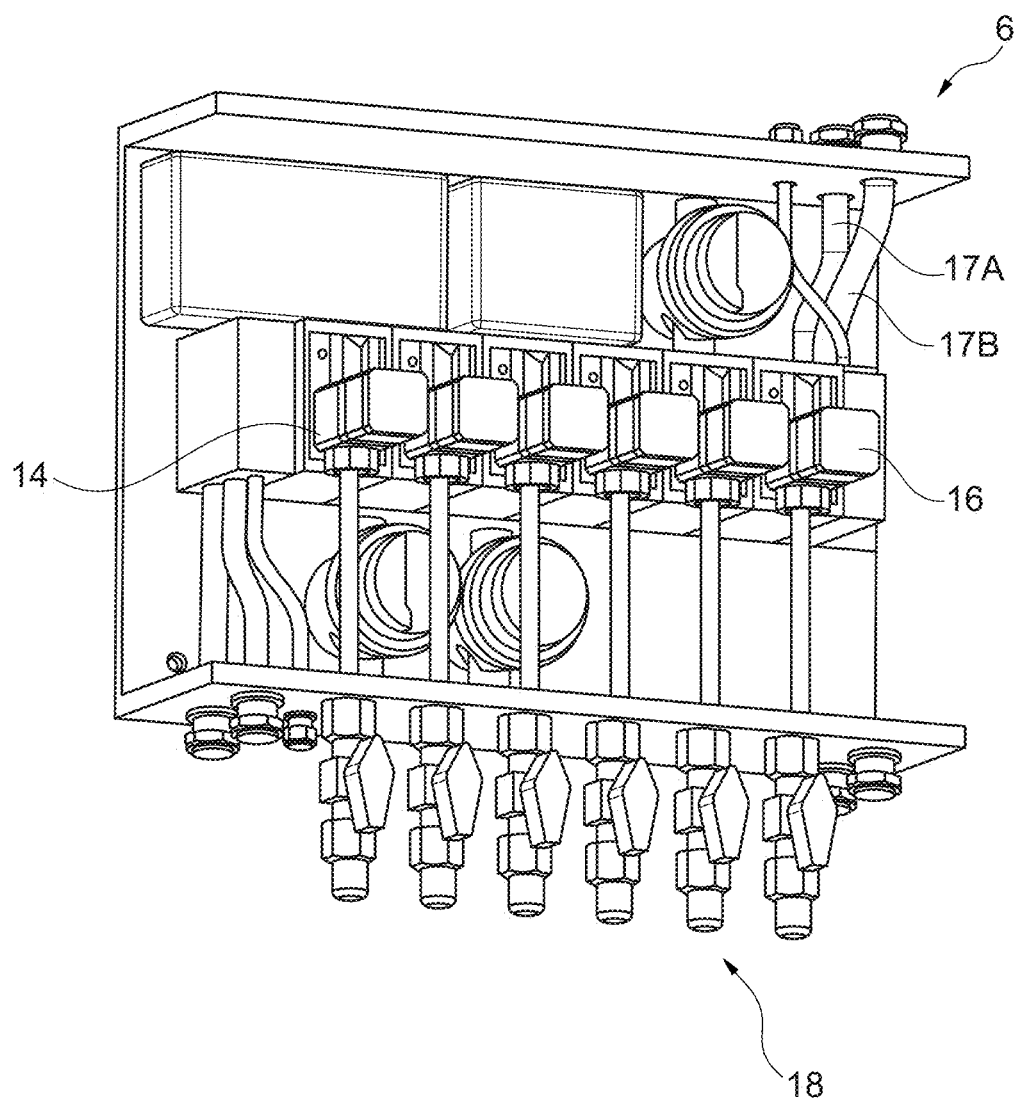
FIG. 3 illustrates parts of an embodiment of controller for a water supply system.

FIG. 3 illustrates parts of an embodiment of controller 6 for a water supply system 1. The controller 6 comprises six separate flow regulators 14, each comprising a valve house (see FIG. 14), two regulation elements (see FIGS. 11A and 111B) and a step motor 16. The hot water inlet 17A and the cold water inlet 17B are located above to provide hot water and cold water to each flow regulator. The piping system 5 forming a separate flow path for water from the central water supply 2 to each of the water taps 3 are to be connected at the outlet 18. At the outlets 18, the pipes (not shown) are connected via a valve which enables manual shut-off of a single pipe in case of repair, maintenance, or emergency.

Figure 4:
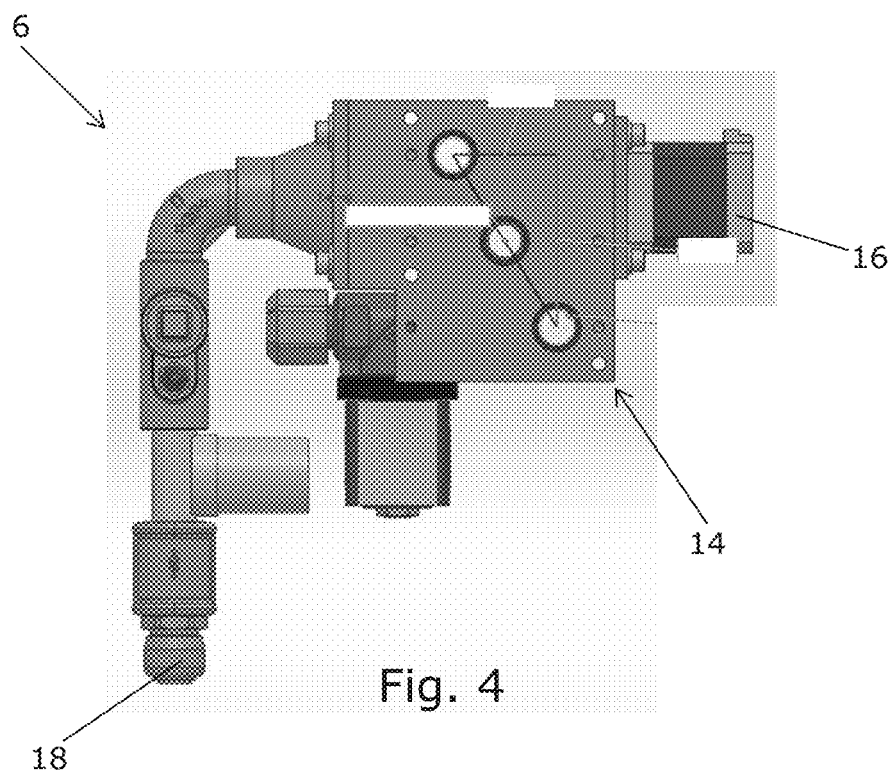
FIGS. 4 and 5 illustrate parts of the controller illustrated in FIG. 3.
Figure 5:
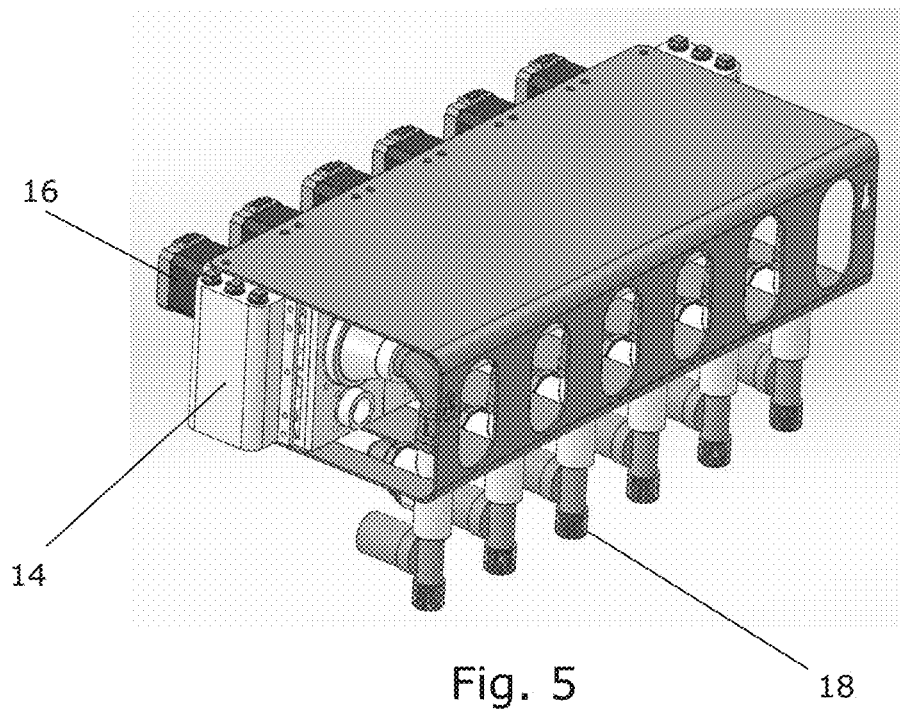

FIGS. 4 and 5 illustrate parts of the controller 6 illustrated in FIG. 3.

Figure 6:
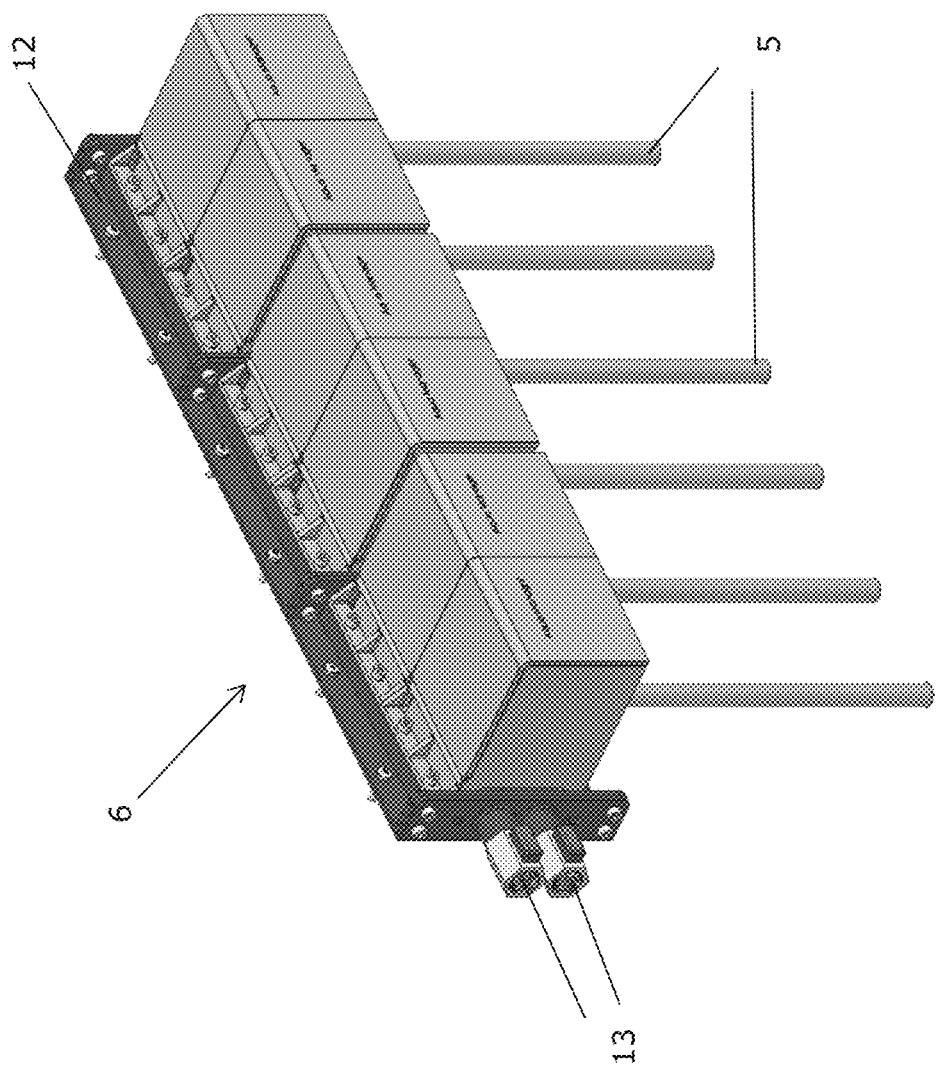
FIG. 6 illustrates parts of an embodiment of a controller for a water supply system, FIG. 7 schematically illustrates water flow through a controller for a water supply system.

FIG. 6 illustrates parts of a controller 6 for controlling the flow of water of an embodiment of a water supply system 1. In the illustrated embodiment, the controller 6 comprises six separate housing elements 10, three manifolds 12, and six flow regulators in the form of valves 14 (see FIG. 3), where a valve 14 is located in each of the separate housing elements 10. Thus, the illustrated controller 6 is configured for controlling a flow of water to six water taps 3. The piping system 5 forming a flow path for water from the central water supply 2 to each of the water taps 3 is illustrated by a part of the separate pipes extending from each of the housing elements 10.

The inlet of hot and cold water is illustrated by the two valves 13.

Figure 7:
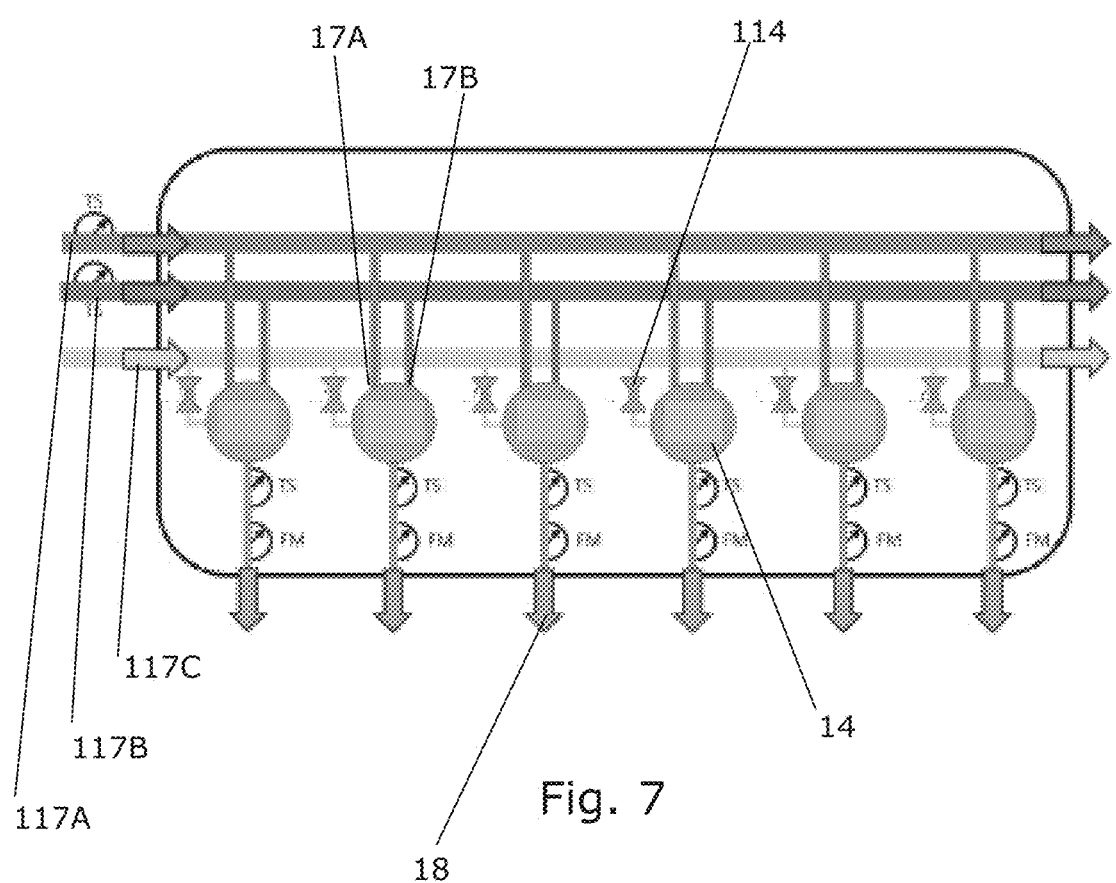

FIG. 7 schematically illustrates water flow through a controller 6 for a water supply system 1. Hot water and cold water are supplied to each flow regulator 14 via a hot water inlet 17A and a cold water inlet 17B. A common hot water pipe 117A supplies hot water, whereas a common cold water supply pipe 117B supplies cold water. In the flow regulator 14, the hot and cold water is mixed to provide water at a requested temperature and flow. In the illustrated embodiment, the flow regulator 14 comprises regulation elements (see also FIGS. 11A and 111B) and a step motor, as described below in relation to FIGS. 10-14.

The controller 6 illustrated in FIG. 7 further comprise an additional valve 114 to allow supply of an additional medium to at least one water tap. In the illustrated embodiment, the additional medium can be supplied to each water tap, as an additional valve 114 is provided in communication with each flow regulator 14. A common additional medium pipe 117C supplies the additional medium.

The water and the additional medium are supplied to each water tap via separate outlets 18.

In the illustrated embodiment, separate flow meters FM and temperature sensors TS are provided at each outlet 18 to thereby provide the ability of monitoring consumption of water both with regard to flow and temperature.

FIG. 8 illustrates separate parts of the controller 6 illustrated in FIG. 6 in an exploded view. Two valves 14 can be attached to the manifold 12 and each of the valves 14 can be covered by a separate housing element 10.

Figure 9C:
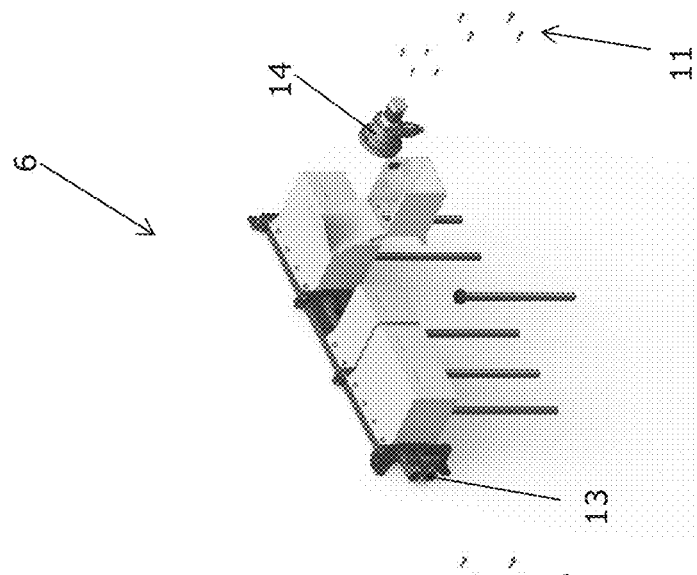
FIGS. 9A-9C illustrate parts of an embodiment of a controller for a water supply system during maintenance/repair.
Figure 9B:
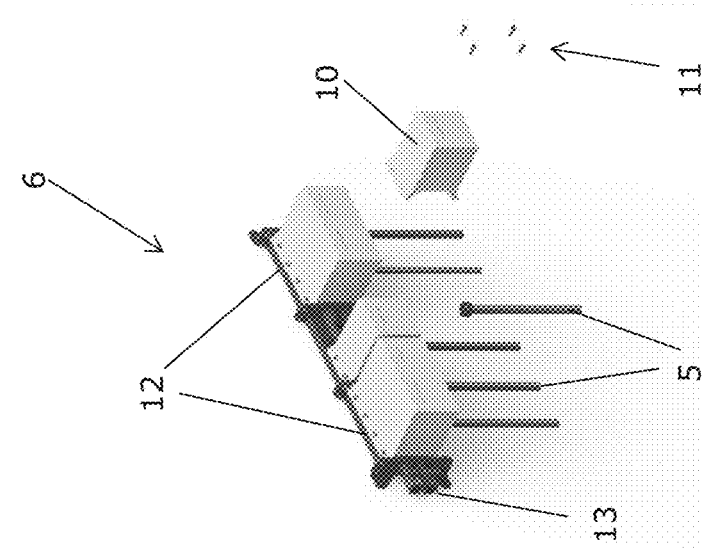
Figure 9A:
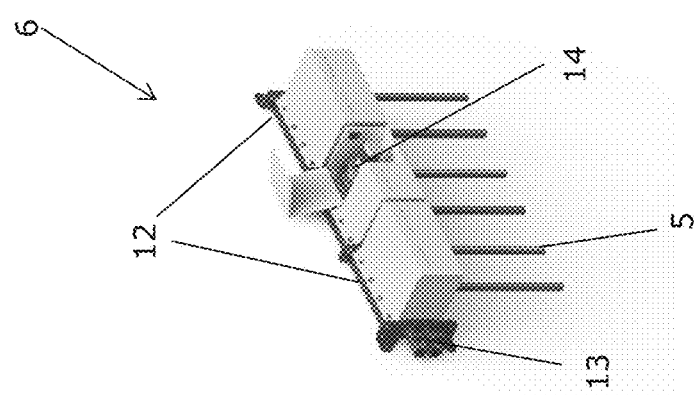

FIGS. 9A-9C illustrate separate parts of the controller 6 illustrated in FIG. 6 during maintenance/repair.

FIG. 9A illustrates replacement and/or adjustment of components of the valve 14. The replacement/adjustment can be performed by opening the housing element 10.

FIG. 9B illustrates replacement of an entire control element 6' of the controller 6. The entire control element 6' can be removed by loosening the four screws 11 and the pipe 5.

FIG. 9C illustrates replacement of parts of the valve 14, where the valve 14 is first removed from the controller 6 and subsequently repaired.

FIGS. 10A-10C illustrate an embodiment of a flow regulator 14 in the form of a valve. The flow regulator 14 comprises a valve house 14A, 14B, two regulation elements 15A, 15B (see also FIGS. 11A and 11B), and a step motor 16. The step motor 16 is configured for moving one of the regulations elements 15B relative to the other regulation element 15A. It should be understood that the step motor in another embodiment may be substituted by another type of motor or drive element capable of moving at least one of the regulation elements.

The inlet to the flow regulator 14 comprises a hot water inlet 17A and a cold water inlet 17B. When moving one of the regulation elements 15B, an opening ratio is adjusted to thereby adjust the flow of water and the temperature of the water leaving the flow regulator 14. The hot water inlet 17A and the cold water inlet 17B are located at one side of the regulation elements 15A, 15B, whereas the outlet 18 of the flow regulator 14 is located at the opposite side of the regulation elements. A mixing chamber 118 is formed at this opposite side of the regulation elements 15A, 15B. The outlet 18 is in fluid communication with the mixing chamber 118 to provide water of required flow and temperature at each water tap.

Figure 11A:
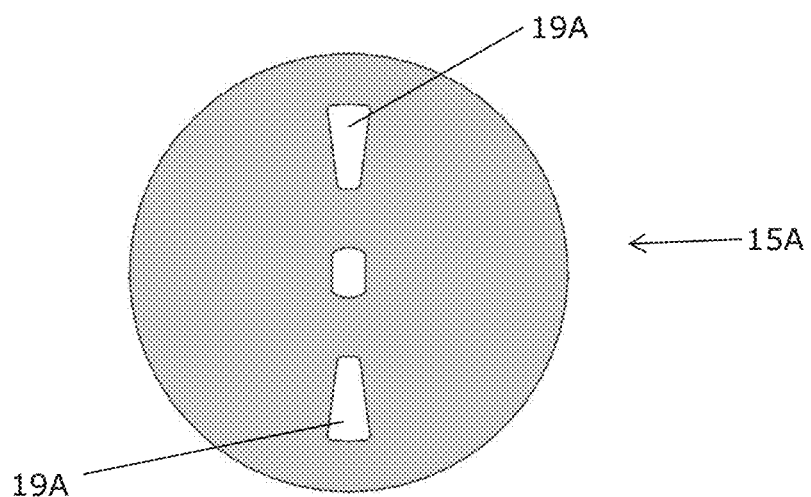
FIGS. 11A-11B illustrate an embodiment of regulation elements of the flow regulator illustrated in FIGS. 10A-10C, FIGS. 12A-12E illustrate the regulation element of FIG. 11B in different positions, FIG. 13 schematically illustrates a cross-section of a part of a controller for a water supply system.
Figure 11B:
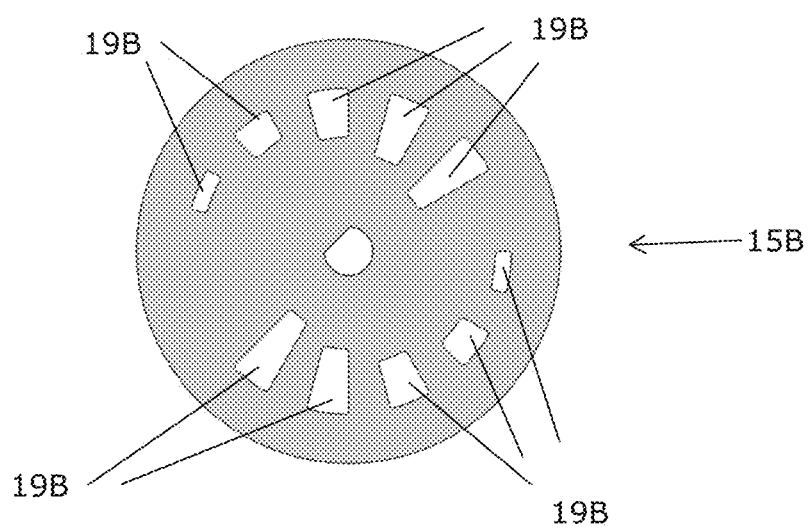

FIGS. 11A-11B illustrate an embodiment of regulation elements 15A, 15B of the flow regulator in FIGS. 10A-10C. In the illustrated embodiment, the regulation element 15B is the movable element, whereas the other regulation element 15A is the stationary element.

The openings 19A in the stationary regulation element 15A are in fluid communication with the hot water inlet 17A and a cold water inlet 17B, respectively. In the illustrated embodiment, the movable regulation element 15B comprises ten openings 19B. Some of the openings 19B are of different size. In the illustrated embodiment, the openings 19B are identical in pairs; i.e. the ten openings 19B are formed so that five different sizes are present. The flow through the flow regulator 14 is dependent on the overlap between the openings 19A in the stationary regulation element 15A and the openings 19B in the movable regulation element 15B.

The overlap also determined the temperature of the flow of water.

Figures 12A, 12B, 12C, 12D, 12E:
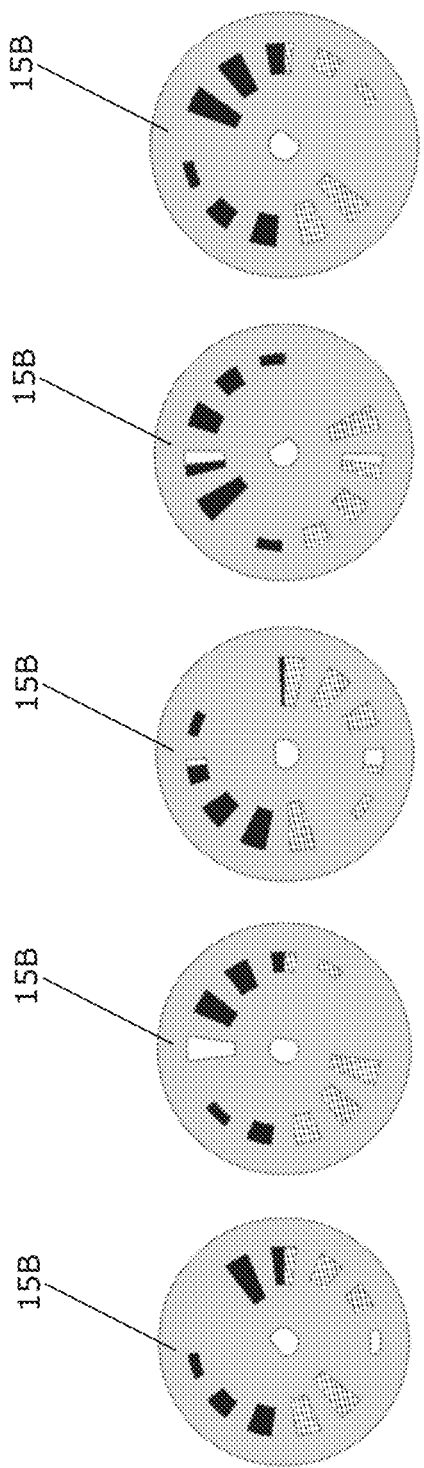

FIGS. 12A-12E illustrate the regulation element 15B of FIG. 11B in different positions. The different positions correspond to different temperature of the flow of water:

FIG. 12A—a water flow at 6 degrees at 1/5 flow
FIG. 12B—a water flow at 60 degrees at 5/5 flow (fully open)
FIG. 12C—a water flow at 20 degrees at 2/5 flow
FIG. 12D—a water flow at 38 degrees at 4/5 flow
FIG. 12E—zero water flow.

The water flows through the flow regulator via the non-coloured openings in FIGS. 12A-12E. The dark coloured openings and the shaded openings are openings in the movable regulation element 15B being blocked by the stationary regulation element 15A.

It should be understood that the above figures correspond to a specific embodiment of the flow regulator 14 with the regulation elements 15A, 15B illustrated in FIGS. 11A and 11B. Flow and water temperature can be varied by providing regulation elements of another size and/or shape, with a different number of openings, with a different size and/or shape of the openings, etc.

Figure 13:
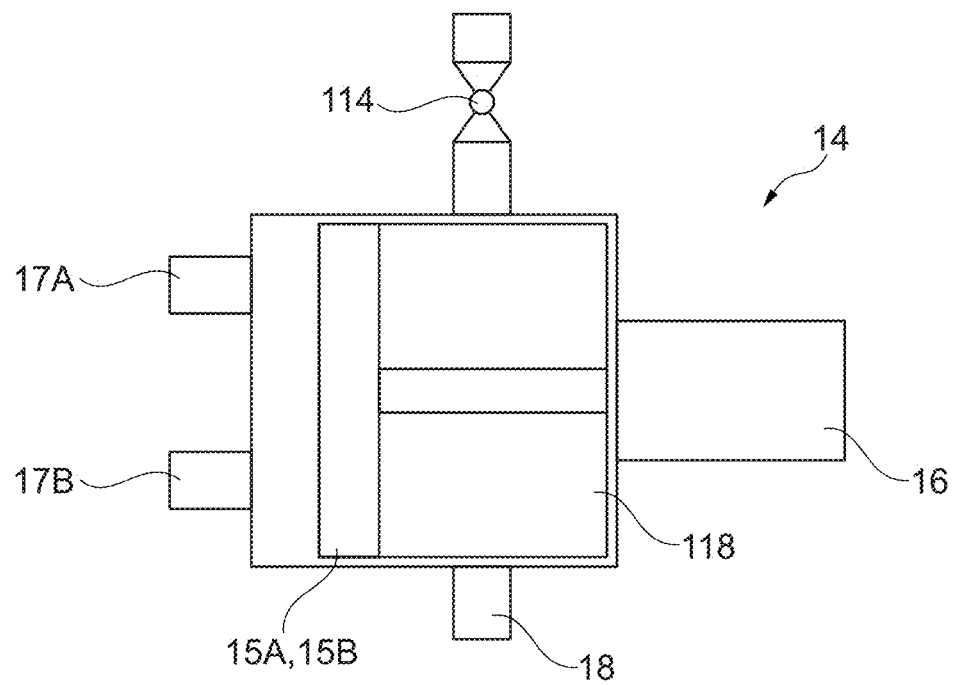

FIG. 13 schematically illustrates a cross-section of a part of a controller 6 for a water supply system 1. The flow regulator 14 comprises two regulation elements 15A, 15B (see also FIGS. 11A and 11B), and a step motor 16. The inlet to the flow regulator 14 comprises a hot water inlet 17A and a cold water inlet 17B. The hot water inlet 17A and the cold water inlet 17B are located at one side of the regulation elements 15A, 15B, whereas the outlet 18 of the flow regulator 14 is located at the opposite side of the regulation elements. A mixing chamber 118 is formed at this opposite side. The outlet 18 is in fluid communication with the mixing chamber 118 to provide water of required flow and temperature at each water tap. An additional valve 114 is provided to allow supply of an additional medium to at least one water tap. The additional medium is provided via the additional valve 114 to the mixing chamber 118.

When the additional medium is provided via the additional valve 114, the regulation elements 15A, 15B may be in closed configuration, whereby water is not allowed to flow through the openings 19A, 19B (see FIG. 11A, 11B) in the regulation elements. Thereby it may be achieved, that the additional medium flows backwards into the hot water and cold water supply.

Figure 14:
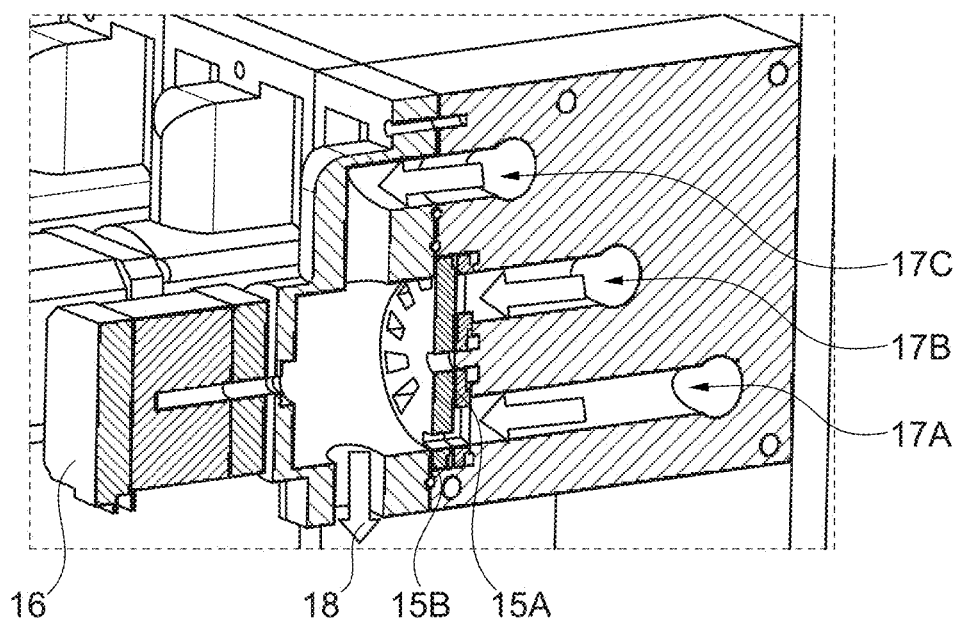
FIG. 14 illustrates a cross-section of a part of a controller for a water supply system, FIG. 15 schematically illustrates an embodiment of a water supply system.

FIG. 14 illustrates a cross-section of a part of a controller 6 for a water supply system 1. The flow regulator 14 comprises two regulation elements 15A, 15B and a step motor 16. The inlet to the flow regulator 14 comprises a hot water inlet 17A and a cold water inlet 17B. An additional medium is provided at the inlet 17C. The outlet 18 is in fluid communication with the mixing chamber 118 to provide water of required flow and temperature at each water tap.

Figure 15:
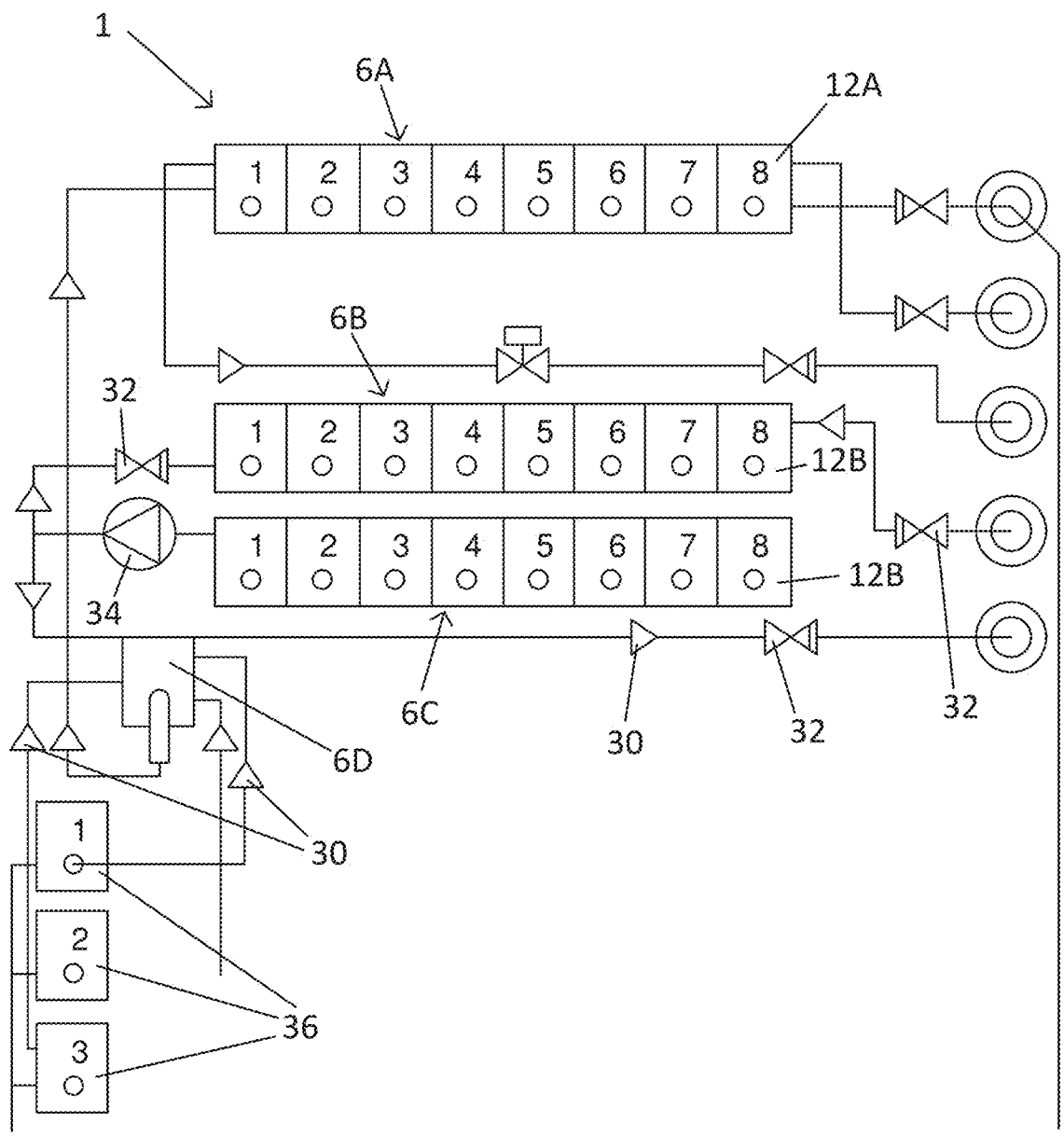

FIG. 15 schematically illustrates an embodiment of a water supply system 1. The upper controller 6A comprises eight manifolds for supply of water to eight different water taps. The middle controller 6B comprises eight manifolds for supply of water to eight different water taps in the form of heaters, such as radiators and/or floor heaters. The lower controller 6C comprises eight manifolds for the return of water form eight different heaters.

The flow directions are illustrated by the arrows 30. The water supply system 1 further comprises a number of check valves 32 and a pump 34.

The water supply system further comprises three different reservoirs 36. In the illustrated embodiment, the upper reservoir 36 labelled 1 is for boiling water, the middle reservoir 36 labelled 2 is for cold water, whereas the lower reservoir 36 labelled 3 is for cold, sparkling water. The three reservoirs 36 (i.e. additional supply devices each comprising an additional medium) are in fluid communication the controller 6D enabling supply of the additional medium to the controllers 6A, 6B, and 6C via an additional inlet (not shown) in each of the controllers.

FIG. 16 illustrates an embodiment of an operation device 4. At the left part of FIG. 9, the operation device 4 is mounted at the wall next to water tap 3 in the form of a washbasin. At the upper part of the operation device 4, the water temperature is displayed, here as 28.6 degrees Celsius. The touch panel 20 is for registration of a touch to thereby operate the controller.

The illustrated operation device 4 comprises a gesture sensor 22 configured for sensing a gesture of a user. In one embodiment, the gesture sensor 22 may be configured to control operation based on the following gestures: An 'up' gesture may increase the flow, whereas a 'down' gesture may decrease the flow. 'Left' and 'right' gestures may increase and decrease the temperature, respectively. A gesture towards the gesture sensor 22 may turn on and/or turn off water. It should be understood, that the above gestures are meant as examples of gestures only. In an alternative embodiment, 'left' and 'right' gestures may increase and decrease the flow, respectively.

It should furthermore be understood, that other gestures may also be applicable, such as gestures of different speed/sensitivity or such as circular gestures.

Figure 17A:
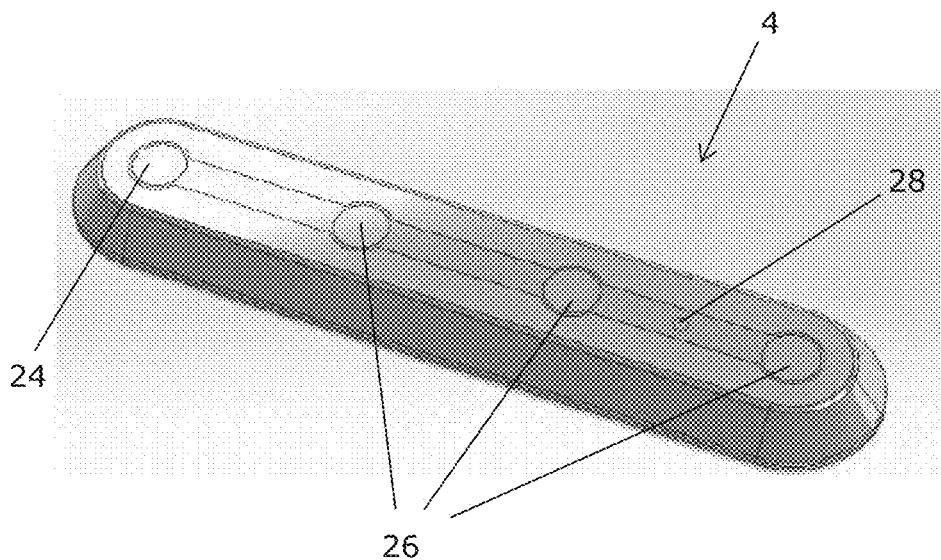
FIGS. 17A and 17B illustrate an alternative embodiment of an operation device.
Figure 17B:
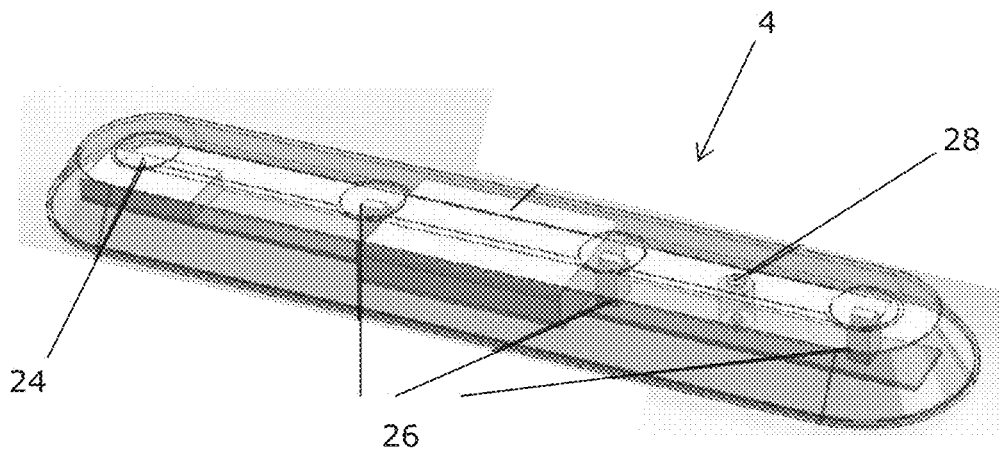

FIGS. 17A and 17B illustrate an alternative embodiment of an operation device 4. In FIG. 17B the internal parts of the operation device 4 are visible. The operation device 4 comprises a battery 28, a proximity sensor 24, and three distance sensors 26. In the illustrated embodiment, a user can choose between five levels of water flow and ten levels of water temperature. This is done by hovering the hand over the three distance sensors 26. By moving the hand up, down, and from side to side, flow and temperature are controlled. The proximity sensor 24 which can be touchless or an on/off button can be used to turn on and off the water tap.

An LED 28 is integrated in the operation device 4. The LED 28 may be used to provide feedback to a user.

Figure 18A:
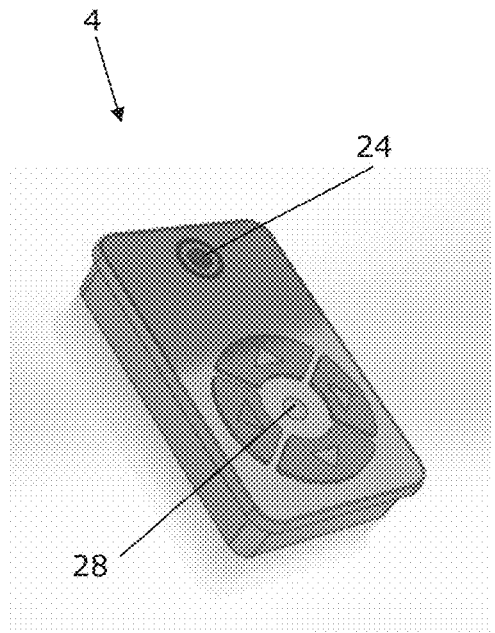
FIGS. 18A-18D illustrate a further alternative embodiment of an operation device.
Figure 18B:
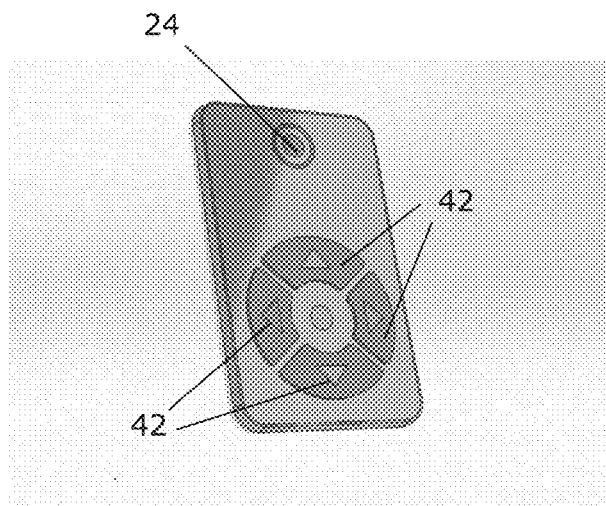
Figure 18C:
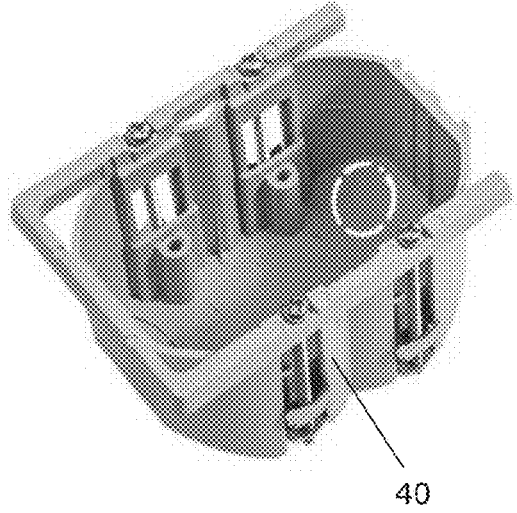
Figure 18D:
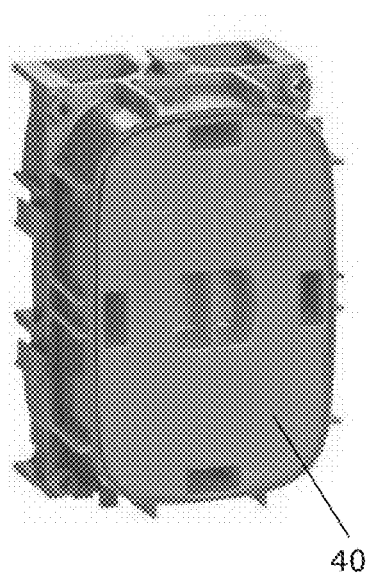

FIGS. 18A-18D illustrate an alternative embodiment of an operation device 4. The illustrated operation device 4 is of a size and shape which allows the operation device to be built into a fixation 40 for a traditional wall socket. The fixation 40 is illustrated in a front-view and from behind in FIGS. 18C and 18D. FIG. 18A is a front view of the operation device 4, and FIG. 18B illustrated the operation device 4 inserted flush into a wall in the fixation 40.

The illustrated operation device 4 comprises four press buttons 42 for controlling water flow and water temperature, an LED 28 to provide feedback to a user, and a sensor 24 which can be used to turn on and off the water tap.

Figure 19A:
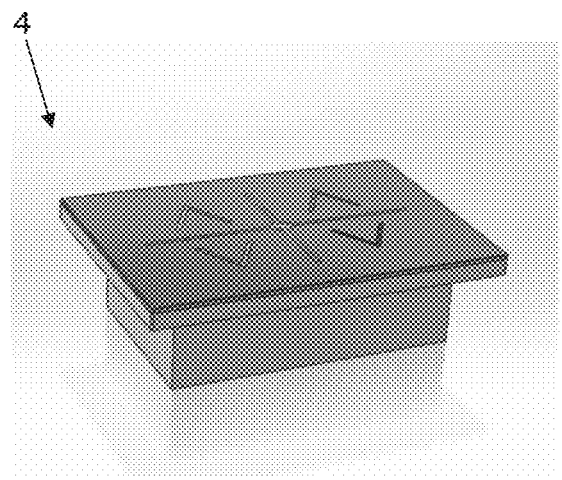
FIGS. 19A-19C illustrate a further alternative embodiment of an operation device.
Figure 19B:
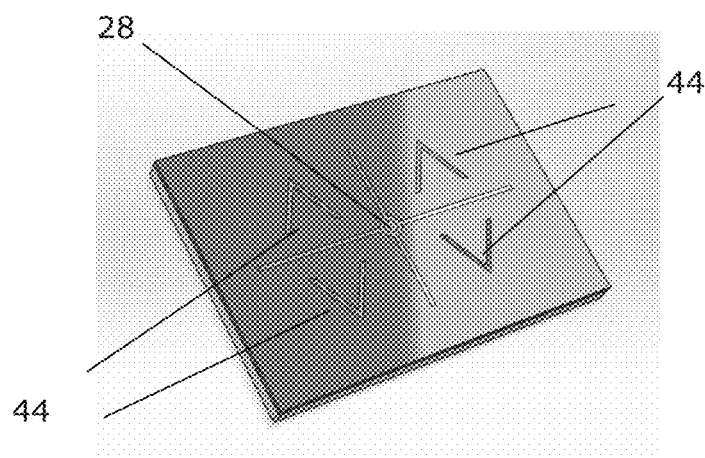
Figure 19C:
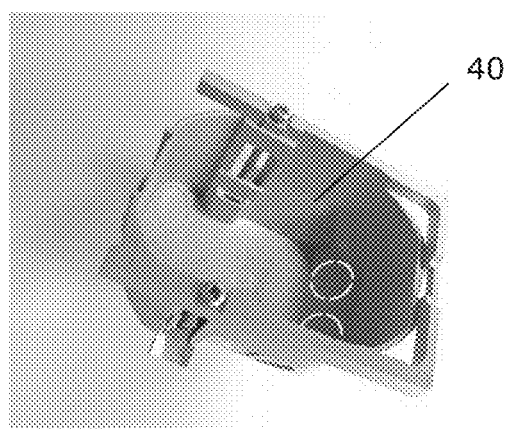

FIGS. 19A-19C illustrate an alternative embodiment of an operation device 4. The illustrated operation device 4 is likewise of a size and shape which allows the operation device to be built into a fixation 40 for a traditional wall socket. The fixation 40 is illustrated in a front-view in FIG. 19C. FIG. 19A is a front view of the operation device 4, and FIG. 19B illustrated the operation device 4 inserted flush into a wall in the fixation 40.

The illustrated operation device 4 comprises four touch sensors 44 for controlling water flow and water temperature by touching the sensors 44, and an LED 28 to provide feedback to a user.

The invention claimed is:

1. A water supply system comprising:
a central water supply;
a plurality of water taps;
an operation device located at one water tap;
a piping system connecting the central water supply and the plurality of water taps, the piping system comprising a separate flow path from the central water supply to each water tap;
a controller for individually controlling a flow of water from the central water supply to the plurality of water taps and individually controlling an outlet temperature of the flow of water at an outlet of the central water supply; the controller comprising a flow regulator for each water tap, the flow regulator being configured for controlling both the flow of water and the outlet temperature of the flow of water; and
a measurement device configured to measure the outlet temperature of the water at the outlet of the central water supply;
wherein the controller is located at the central water supply,
wherein the controller is operable via the operation device at the water tap and is configured to control the flow of water and the outlet temperature based on a received demand from the operation device,
wherein measurements from the measurement device are used as input in an adjustment algorithm executed by the controller, and
wherein the adjustment algorithm is configured to calculate a required outlet temperature of water at the outlet of the central water supply in dependency of a desired water temperature at the water tap and a distance between the water tap and the central water supply.

2. The water supply system according to claim 1, wherein the operation device is configured to generate an electric demand signal, and
wherein the controller is configured to receive the electric demand signal and configured to control the flow of water and the outlet temperature in response to the demand signal.

3. The water supply system according to claim 1, wherein an operation device is located at each water tap, and
wherein the operation device is configured for communication with the controller to control the flow of water to the water tap and to control the outlet temperature of the flow of water from the central water supply.

4. The water supply system according to claim 1, wherein the operation device is configured to receive an operation signal in the form of at least one of a touch signal, an audible signal, and a gesture signal, and configured to operate the controller based on the received signal.

5. The water supply system according to claim 1, further comprising a database,
wherein the controller is in communication with the database comprising a plurality of predetermined control strategies, each defining a requested water flow and a requested temperature,
wherein the operation device is configured for selection of at least one predetermined control strategy;
wherein the predetermined control strategies correspond to a number of user patterns, including: tooth brushing, hand washing, and showering; and
wherein at least one of the predetermined control strategies is stored in the database.

6. The water supply system according to claim 1, wherein the piping system comprises an inner tube and an outer tube being co-axially arranged, where the outer tube is configured for protection of the inner tube.

7. The water supply system according to claim 1, further comprising a monitoring unit,
wherein the controller is configured to forward to the monitoring unit a use signal specifying the flow of water from the central water supply, and
wherein the monitoring unit is configured to store said use signal.

8. The water supply system according to claim 7, wherein the controller is further configured to forward to the monitoring unit a temperature signal specifying the temperature of the flow of water from the central water supply, and
wherein the monitoring unit is configured to store said temperature signal.

9. The water supply system according to claim 7, wherein the monitoring unit is configured to separately store use signals for each water tap and is further configured to compare the use signals with previously stored use signals to detect leaks.

10. The water supply system according to claim 1, further comprising a reservoir, wherein the central water supply is in fluid communication with the reservoir comprising an additional medium, and wherein supply of the additional medium to at least one water tap is controlled by the controller.

11. The water supply system according to claim 10, wherein the controller is configured for simultaneous control of supply of the flow of water and supply of the additional medium to at least one water tap.

12. The water supply system according to claim 1, wherein the controller is configured to monitor flow and temperature of water in the piping system, the controller being further configured to generate a warning signal to alert users of bacterial risk in a part of the piping system.

13. The water supply system according to claim 12, wherein the controller is configured to receive a request from a user in response to the warning signal for the water supply system to perform a flushing action of heated water through the part of the piping system.

14. A method of controlling a water supply system comprising a central water supply; a plurality of water taps; an operation device located at one water tap; a piping system connecting the central water supply and the plurality of water taps, the piping system comprising a separate flow path from the central water supply to each water tap; a controller for individually controlling a flow of water from the central water supply to the plurality of water taps and individually controlling an outlet temperature of the flow of water at an outlet of the central water supply, the controller including a flow regulator for each water tap, the flow regulator being configured for controlling both the flow of water and the outlet temperature of the flow of water, the controller being located at the central water supply; and a measurement device configured to measure the outlet temperature of the water at the outlet of the central water supply; the method comprising:

operating the controller via the operation device at the water tap to control the flow of water and the outlet temperature based on a received demand from the operation device;

inputting measurements from the measurement device into an adjustment algorithm executed by the controller;

using the adjustment algorithm, determining a required outlet temperature of water at the outlet of the central water supply in dependency of a desired water temperature at the water tap and a distance between the water tap and the central water supply.

15. A controller for controlling a flow of water in a water supply system, the controller comprising an operation device for receiving a user demand, a flow regulator for controlling a flow in the water supply system and for controlling an outlet temperature of the flow of water at an outlet of a central water supply, the controller comprising a separate flow regulator for each water tap, each separate flow regulator being configured for controlling both the flow of water and the outlet temperature of the flow of water; and a communication device for communication with the operation device, wherein the controller is configured to control the flow of water and an outlet temperature of the flow of water at an outlet of the central water supply based on a received demand from the operation device;

wherein measurements from the measurement device are used as input in an adjustment algorithm for execution by the controller; and wherein the controller is further configured to, using the adjustment algorithm, calculate a required outlet temperature of water at the outlet of the central water supply in dependency of a desired water temperature at the water tap and a distance between the water tap and the central water supply.

16. The controller according to claim 15, wherein the flow regulator and the operation device are two separate devices, and wherein the flow regulator is configured to be positioned at a central water supply.

* * * * *